(12) United States Patent
Yasukawa (10) Patent No.: US 8,002,090 B2
(45) Date of Patent: Aug. 23, 2011

(54) ELECTRO-MECHANICAL BRAKE APPARATUS

(75) Inventor: Daisuke Yasukawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1254 days.

(21) Appl. No.: 11/654,006

(22) Filed: Jan. 17, 2007

(65) Prior Publication Data

US 2007/0199775 A1  Aug. 30, 2007

(30) Foreign Application Priority Data

Feb. 28, 2006 (JP) ................................. 2006-053035

(51) Int. Cl.
*B60L 7/00* (2006.01)
*F16D 55/00* (2006.01)

(52) U.S. Cl. ...... 188/158; 188/71.1; 188/73.1; 188/156; 188/157

(58) Field of Classification Search .......... 188/71.1, 188/73.1, 156, 157, 158
See application file for complete search history.

(56) References Cited

U.S. PATENT DOCUMENTS

| | | | | |
|---|---|---|---|---|
| 5,050,711 A | * | 9/1991 | Sawato | 188/164 |
| 6,040,665 A | * | 3/2000 | Shirai et al. | 318/14 |
| 6,138,801 A | * | 10/2000 | Shirai et al. | 188/157 |
| 6,354,674 B1 | * | 3/2002 | Iwamoto et al. | 303/119.3 |
| 6,799,813 B2 | | 10/2004 | Staltmeir | |
| 6,959,791 B2 | * | 11/2005 | Usui | 188/72.1 |
| 2003/0038482 A1 | * | 2/2003 | Dubus et al. | 290/36 R |
| 2003/0083797 A1 | * | 5/2003 | Yokoyama et al. | 701/70 |
| 2005/0018390 A1 | * | 1/2005 | Sanada et al. | 361/679 |
| 2006/0180365 A1 | | 8/2006 | Innami et al. | |

FOREIGN PATENT DOCUMENTS

| | | |
|---|---|---|
| DE | 199 61 680 A1 | 6/2001 |
| DE | 100 61 950 A1 | 7/2002 |
| DE | 102 57 508 A1 | 2/2004 |
| JP | 2003-287069 A | 10/2003 |
| JP | 2006-103562 A | 4/2006 |
| WO | WO 0236982 A1 * | 5/2002 |

OTHER PUBLICATIONS

European Search Report dated Jun. 29, 2007 (seven (7) pages).

* cited by examiner

*Primary Examiner* — Bradley T King
*Assistant Examiner* — Mahbubur Rashid
(74) *Attorney, Agent, or Firm* — Crowell & Moring LLP (57) ABSTRACT

The invention provides a brake apparatus in which a vibration resistance and a heat resistance are improved, in a control apparatus of an integrally structured brake in which an electric circuit portion is attached to a brake force generating portion of the brake apparatus. In the control apparatus of the integrally structured brake in which the electric circuit portion is attached to the brake force generating portion of the brake apparatus, the structure is made such that an opening is provided in a circuit side case and a connected portion is arranged in a space within the opening, in order to secure an assured electric connection after attaching the circuit portion. A connecting work can be executed from the opening portion, a vibration resistance can be improved, and a heat resistance can be improved.

6 Claims, 11 Drawing Sheets

ELECTRO-MECHANICAL BRAKE APPARATUS

BACKGROUND OF THE INVENTION (1) Field of the Invention

The present invention relates to an electro-mechanical brake technique for a vehicle for controlling a generation torque of a motor so as to control a braking force of a brake.

(2) Description of Related Art

There has been known an electro-mechanical brake apparatus which computes a braking control signal of a brake on the basis of an operation amount of a brake pedal by a control circuit, controls a torque generated by a motor on the basis of the computed braking command, and controls a braking force of the brake. This kind of brake is disclosed in patent document 1 (JP-A-2003-287069).

It is necessary to secure a reliability capable of sufficiently resisting a vibration in an electric circuit mounted on a vehicle. In order to improve a ride quality, the vehicle has a spring absorbing a vibration from a wheel, and suppresses the vibration of a vehicle body by the spring. The vibration absorbed by the spring is applied to an electric apparatus mounted on the vehicle body.

However, the brake apparatus is attached to an unsprung position, that is, a position close to the wheel corresponding to a vibration source from the spring in a transmission system of the vibration mentioned above. If an electric circuit is integrally attached to the brake apparatus, the vibration before being damped by the spring mentioned above is transmitted to the electric apparatus, and a reliability relating to a vibration resistance is required so as to resist this violent vibration.

BRIEF SUMMARY OF THE INVENTION

An object of the present invention is to provide an electro-mechanical brake apparatus in which a vibration resistance is more improved.

In accordance with the present invention, an opening is provided in a metal case covering an electric circuit, and a connection of an electric bus bar is positioned in an inner side of the opening.

In accordance with the present invention, since the opening is provided in the metal case covering the electric circuit, and the connection portion of the bus bar is provided in the inner portion of the opening, it is possible to execute a connecting work via the opening of the case, and it is possible to achieve a connection having a high reliability capable of resisting a vibration. Therefore, in accordance with the present invention, it is possible to provide an electro-mechanical brake apparatus having a high vibration resistance.

Other objects, features and advantages of the invention will become apparent from the following description of the embodiments of the invention taken in conjunction with the accompanying drawings.

DETAILED DESCRIPTION OF THE INVENTION

A description will be given below of embodiments in accordance with the present invention.

Embodiment 1

Figure 1:
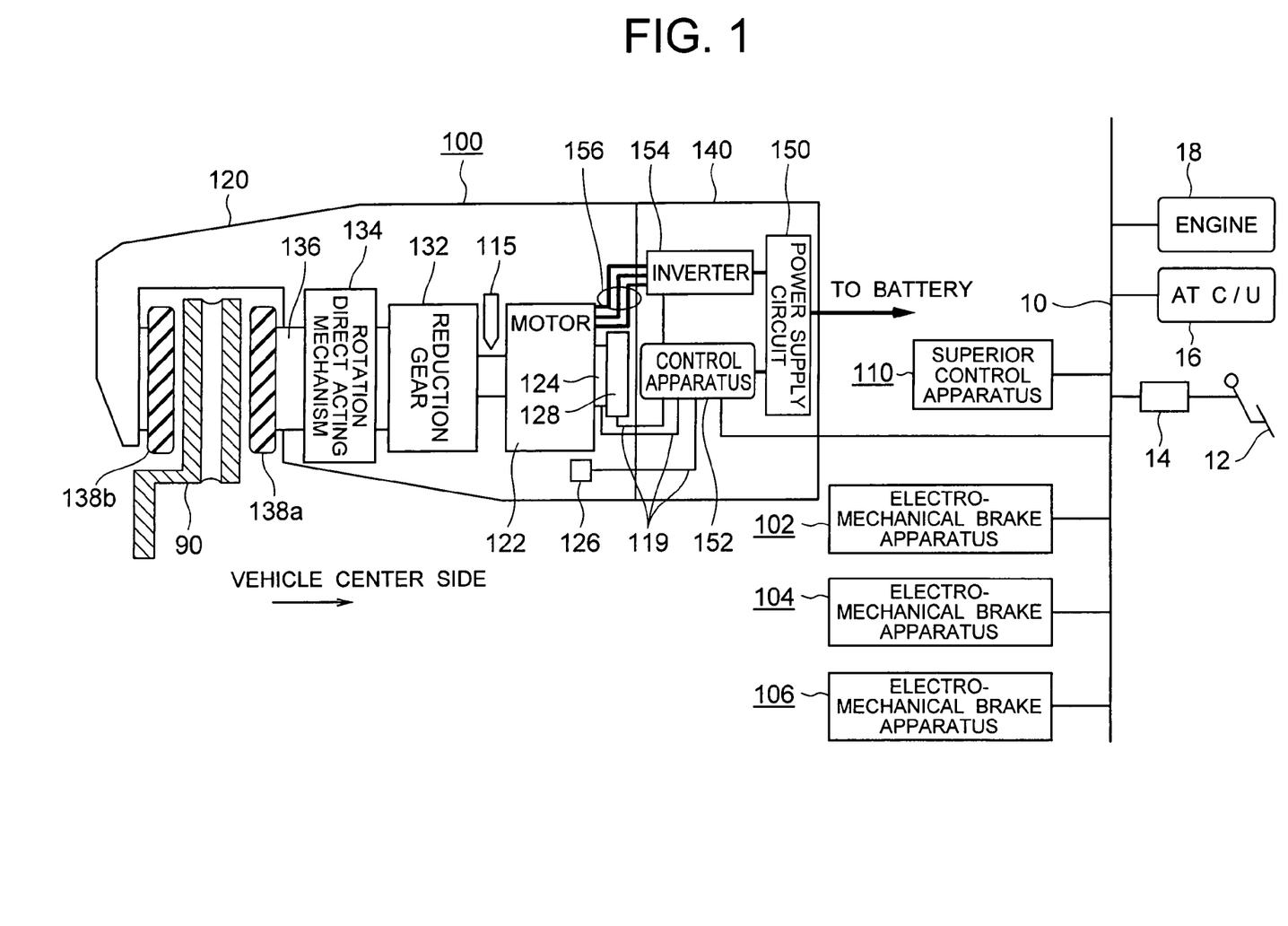
FIG. 1 is a view showing an electro-mechanical brake system.

FIG. 1 shows a control system having an electro-mechanical brake apparatus 100 in accordance with an embodiment of the present invention. A vibration of a wheel is transmitted to a vehicle body (not shown) via a spring (not shown). The vibration of the wheel is damped by the spring. In this vibration transmitting system, the electro-mechanical brake apparatus 100 is attached to a wheel side corresponding to a vibration source rather than the spring mentioned above, and is necessarily structured such as to resist a violent vibration before being damped by the spring transmitted to the electro-mechanical brake apparatus 100.

In the present embodiment, the electro-mechanical brake apparatus 100 is structured such that an electric circuit portion 140 is integrally attached to a caliper corresponding to a brake force generation portion 120. Further, the electric circuit portion 140 is structured such as to resist the vibration being damped by the spring mentioned above. In order to make it possible to improve the vibration resistance mentioned above, the electric circuit portion is manufactured at a high reliability by a manufacturing line, however, it is necessary to execute an electric connection after integrally attaching the electric circuit portion 140 to the braking force generation portion 120 at a high reliability. In the present embodiment, a metal case is provided in an outer periphery of the electric circuit portion 140 mentioned above, an opening is provided in this case, the connection mentioned above is executed at a position inside the opening at a time of integrally attaching the electric circuit portion 140 to the braking force generation portion 120, and he opening is thereafter closed by an additional member. In accordance with this structure, it is possible to achieve a connection having a high reliability which can resist the violent vibration before being damped by the spring. Further, it is possible to check out the connected state from the opening. Further, it is possible to insert a tool and a device necessary for the connection from the opening, at a time of connecting, and a workability is improved.

A description will be given of a brake system in FIG. 1. A pedaling amount of a brake pedal 12 on the basis of a braking operation of a driver is detected by a stroke sensor 14, and a detected output is loaded into a superior control apparatus 110 via a communication line 10. Further, an engine control apparatus 18 and a shift control apparatus 16 are connected to the communication line 10. The superior control apparatus 110 is connected to these control apparatuses 16 and 18 via the communication line 10, information necessary for controlling the electro-mechanical brake apparatus 100 is loaded into the superior control apparatus 110 from these control apparatuses, and the information is transmitted to the control apparatuses 16 and 18 mentioned above from the superior control apparatus 110. The communication line 10 can utilize various systems, however, can employ, for example, a control area network (CAN).

The electro-mechanical brake apparatuses 100, 102, 104 and 106 correspond to apparatuses for controlling a braking force of respective wheels of a vehicle, in which the electro-mechanical brake apparatuses 100 and 102 correspond to the apparatuses for respectively controlling the braking force of the left and right front wheels, and the electro-mechanical brake apparatuses 104 and 106 correspond to the apparatuses for respectively controlling the braking force of the left and right rear wheels. The electro-mechanical brake apparatuses 100, 102, 104 and 106 basically have the same structure, however, since there is a case that a generated braking force is different between the front wheels and the rear wheels, there is a case that a maximum generated braking force is different. As mentioned above, the braking force is different in some cases, however, since the electro-mechanical brake apparatus has the same basic structure and basic operation, a description will be representatively given below of the electro-mechanical brake apparatus 100.

The superior control apparatus 110 is installed to a vehicle body on a spring reducing the vibration from the wheel, however, the electro-mechanical brake apparatus 100 is provided in a lower side of the spring mentioned above, that is, close to the wheel rather than the spring in a vibration transmission system, and a violent vibration before being damped by the spring is transmitted to the electro-mechanical brake apparatus 100.

The electro-mechanical brake apparatus 100 has a braking force generation portion 120 and an, electric circuit portion 140 integrally attached to the braking force generation portion 120. The electric circuit portion 140 has a subordinate control apparatus 152, an inverter module 154 and a power supply circuit 150 supplying an electric current to these circuits. A direct current is supplied to the power supply circuit 150 from a battery corresponding to a direct-current power supply, and the direct current is supplied to the subordinate control apparatus 152 and the inverter module 154. The electric circuit portion 140 is provided with a capacitor and a noise removing coil for reducing a noise making an intrusion from an external portion and reducing a noise delivered to an external portion from the electric circuit portion 140.

A command value of the braking force of each of the wheels is transmitted from the superior control apparatus 110 to each of the electro-mechanical brake apparatuses 100, 102, 104 and 106 via the communication line 10. In the same manner as the other electro-mechanical brake apparatus, the subordinate control apparatus 152 of the electro-mechanical brake apparatus 100 receives the braking command from the superior control apparatus 110, computes a torque to be generated of the motor 122 on the basis thereof, and generates a control signal controlling the inverter module 154, for example, a gate signal. The inverter module 154 generates a stator current corresponding to a three-phase current for driving the motor 122 on the basis of the gate signal, and the three-phase current is supplied to a stator coil winding of the motor 122 via a current supply line 165.

The brake force generation portion 120 of the electro-mechanical brake apparatus 100 is provided with a motor 122 generating a rotation torque, a reduction gear 132 decelerating the rotation of the motor 122 so as to transmit, a rotation-linear transducer 134 changing a rotational motion to a linear motion, a piston 136 transmitting a direct acting motion, brake pads 138a and 138b pressing a disc rotor of the brake on the basis of a pressing force of the piston 136. In this embodiment, it is desirable that a small-size high-output motor is used as the motor 122, and a permanent magnet type rotation synchronous motor is used.

The motor 122 generates the rotation torque on the basis of the supplied drive current by supplying the three-phase ac current generated in the inverter module 154 to the stator coil winding of the motor 122. The reduction gear 132 decelerates the rotating speed of the motor 122, and transmits the rotational motion to the rotation-linear transducer 134. A maximum generation torque required in the motor 122 is lowered by setting the reduction gear. The rotational motion is changed to the linear motion by the rotation-linear transducer 134 converting the rotational motion of the motor into the linear motion, the linear motion is transmitted to the piston 136, the piston 136 presses the brake pad 138a, and the brake pad 138a presses the disc rotor 113. Further, the electro-mechanical brake apparatus 100 is moved backward with respect to a carrier (not shown) by a reaction force, and the brake pad 138b in an outer side of the vehicle is pressed to the disc rotor 113. Accordingly, a braking force in correspondence to the torque of the motor 122 is generated. The rotation-linear transducer 134 is achieved by using a ball ramp mechanism, a ball screw mechanism or the like.

The electric circuit portion 140 has the inverter module 154 supplying the three-phase ac current to the motor 122, the inverter module 154 is provided with an inverter connected to a three-phase bridge, the inverter is switched on the basis of a gate signal generated by a gate circuit provided within the subordinate control apparatus 152, and the three-phase ac current controlling the rotating direction and the rotating speed of the motor 122 is generated.

Further, the electro-mechanical brake apparatus 100 is provided with a lock mechanism 115 as a braking force holding means for mechanically holding the braking force without consuming an electric energy in a parking state. The lock mechanism 115 is constituted by a solenoid, a plunger (now shown) and the like, and corresponds to a mechanism serving as a parking brake.

A temperature sensor 126 is a sensor detecting a state of the motor 122 by detecting a temperature of the motor 122, and is constituted, for example, by a thermo couple. A detected value of the sensor 126 is transmitted to the subordinate control apparatus 152 by a special purpose line 119.

A rotation angle sensor 124 corresponds to a sensor detecting an angle of rotation of the rotor corresponding to a position of the rotor of the motor 122, and is constituted, for example, by a Hall element, an encoder, a resolver or the like. An output of the sensor 124 is transmitted to the subordinate control circuit 152 by the special purpose line 119, and is used for controlling the inverter module 154.

A thrust sensor 128 corresponds to a sensor detecting the braking force generated by the brake force generation portion 120 by detecting a thrust of the piston 136, and is constituted, for example, by a strain gauge type load cell or the like. An output of the sensor is transmitted to the subordinate control apparatus 152 by the special purpose line 119, expresses an actual braking force in response to the braking command of the superior control apparatus 152, and is used for a feedback control controlling the generated torque of the motor 122 so as to achieve the braking control signal mentioned above.

The signals output from these sensors as mentioned above are transmitted to the subordinate control apparatus 152 via the special purpose signal lines 119 respectively connecting the sensors and the subordinate control apparatus 152. Since the special purpose signal line passes through the inner portion of the brake force generation portion 120 and is connected to the inner portion of the integrally fixed electric circuit portion 140, it is protected by a metal case provided in an outer periphery of the brake force generation portion 120 and the electric circuit portion 140, and can reduce an influence of an electric noise. Further, a wiring work at a time of installing each of the electro-mechanical brake apparatuses 100 to 106 to the vehicle body is reduced, and a workability is improved. Further, since the brake force generation portion 120 and the electric circuit portion 140 are vibrated approximately in the same manner in response to the violent vibration, a stress generated in accordance with a vibration phase between the brake force generation portion 120 and the electric circuit portion 140 is hardly generated in the special purpose line, and a reliability of a vibration resistance is high. Further, the sensor output is constituted by an analogue signal, however, a distance to the subordinate control apparatus 152 is short, and a precision reduction by the special purpose line is low. The outputs of the sensors are converted into digital values by the subordinate control apparatus 152, and are transmitted to the superior control apparatus 110 and the other control apparatuses via a communication line 10 as occasion demands, after being converted into the digital values. A transmitting distance by the communication line 10 is long, however, since the transmission is executed by the digital signal, it is possible to maintain a high precision and a high reliability.

Figure 2:
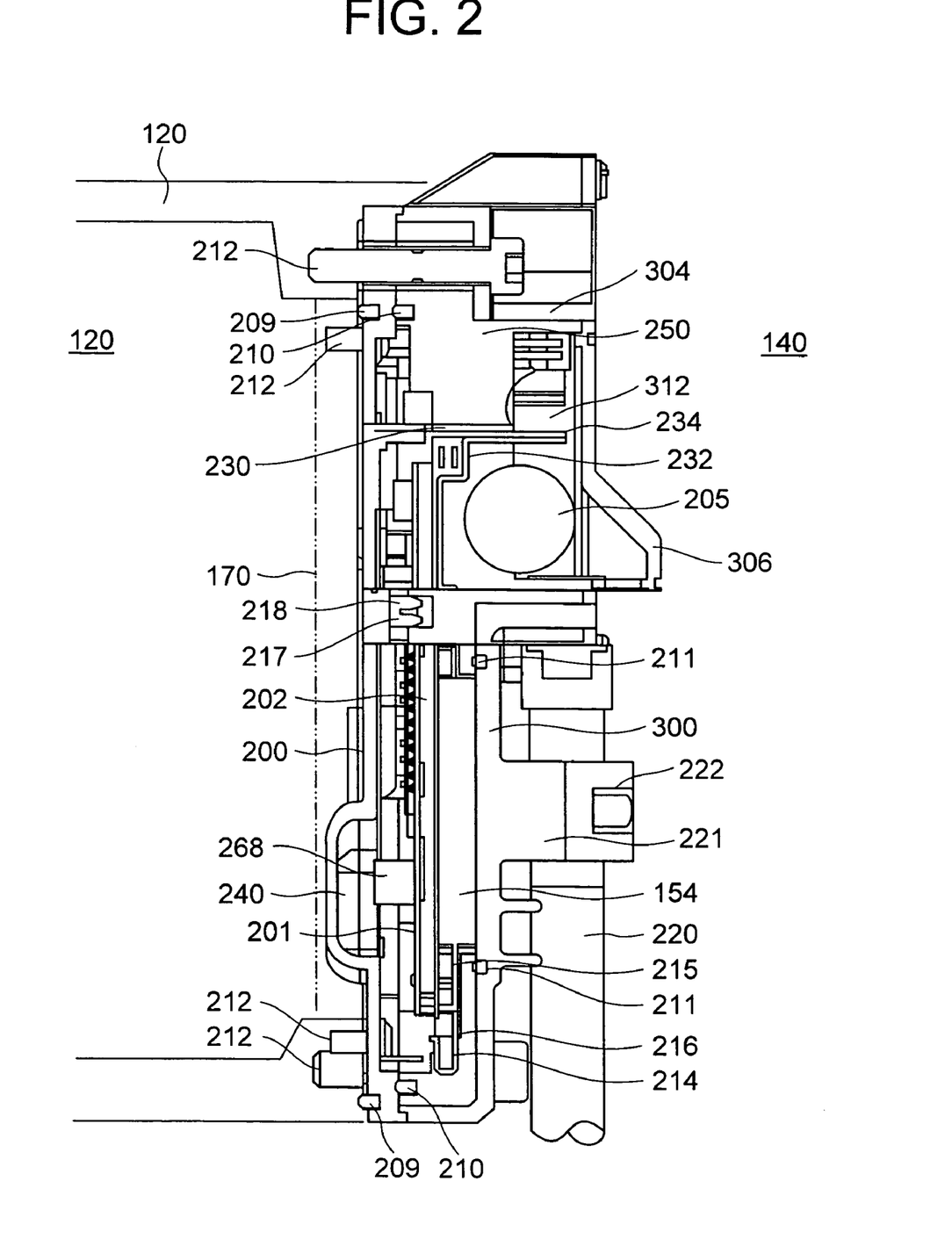
FIG. 2 is a cross sectional view of a circuit portion of an electro-mechanical brake apparatus.
Figure 3:
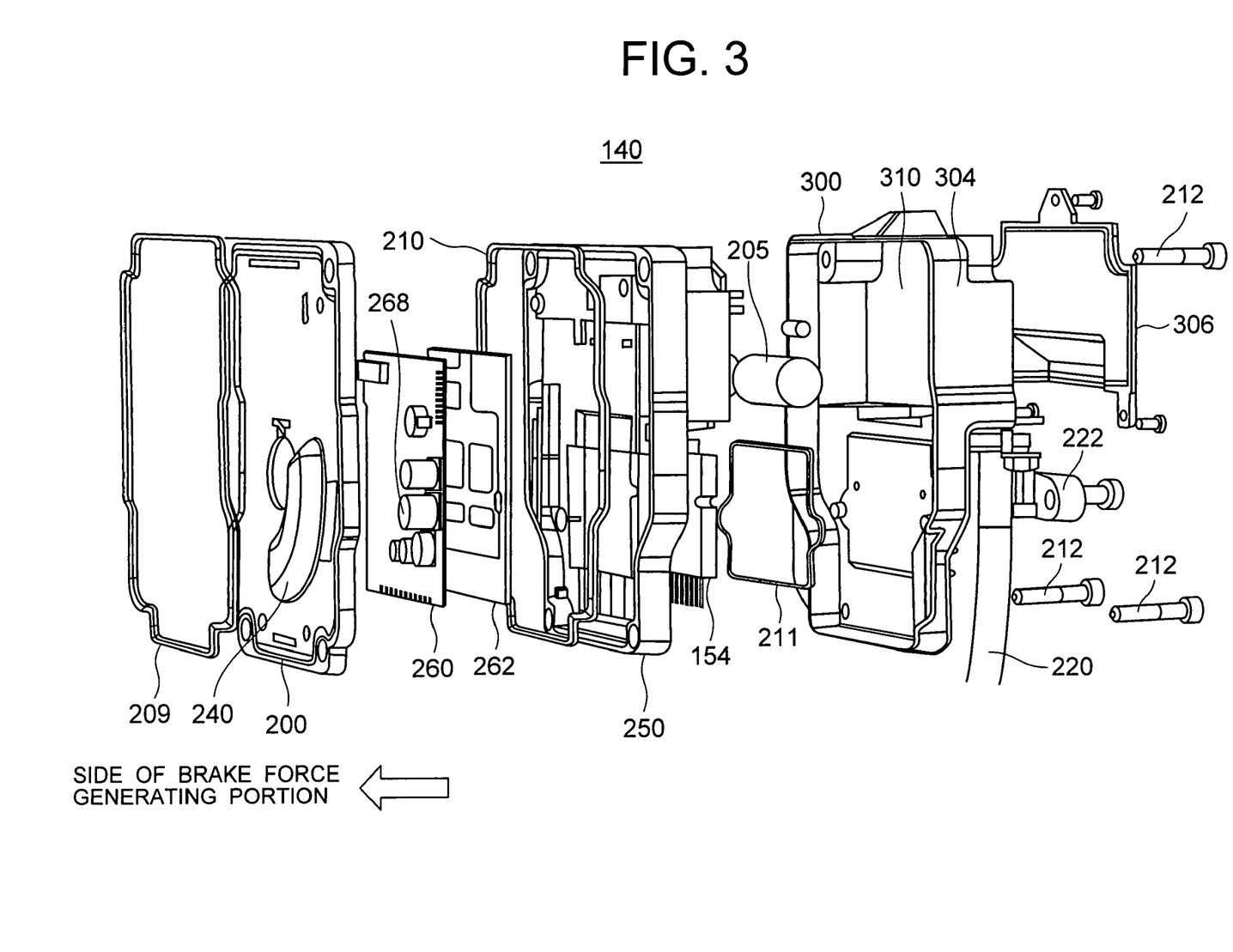
FIG. 3 is an assembly view of the circuit portion of the electro-mechanical brake apparatus.

FIG. 2 shows an internal cross sectional view of the electric circuit portion 140. Further, FIG. 3 is an exploded view of the electric circuit portion 140. In this case, in FIG. 3, the same reference numerals as those attached to FIG. 2 are attached to portions corresponding to FIG. 2, and a description thereof will be omitted. The brake force generation portion 120 of the electro-mechanical brake apparatus 100 shown in FIG. 1 is covered by the metal case, and a seal means of provided in a movable portion of the brake pad 138*a* and the piston 111, whereby a water is prevented from entering into the inner portion of the brake force generation portion 120. The metal case constituting an outer periphery of the brake force generation portion 120 is open in a portion in which the electric circuit portion 140 is attached. The electric circuit portion 140 is covered by the metal case in the same manner, however, is open in a side of the brake force generation portion 120, and is integrally attached in such a manner that the opening of the metal case of the electric circuit portion 140 faces to the opening of the metal case of the brake force generation portion 120.

A resin plate 200 is arranged between the opening of the brake force generation portion 120 and the opening of the electric circuit portion 140, and each of the openings mentioned above is closed by the resin plate 200.

Since the brake force generation portion 120 generates the braking force by pressing the brake pads 138*a* and 138*b* to the disc rotor, a lot of heat is generated in a portion of the brake pads 138*a* and 138*b*. This heat is transmitted via a mechanical structure in the inner portion of the brake force generation portion 120, however, it is possible to reduce transmission of the friction heat to the electric circuit portion 140 on the basis of the arrangement of the resin plate 200 mentioned above.

A portion to which a tint ink is applied in FIG. 2 shows a cross section of the resin plate 200. An illustration of the resin plate 200 close to the brake force generation portion 120 is omitted, however, a space is provided along a surface close to the brake force generation portion 120 of the resin plate 200. For example, a left side of a two-dot chain line 170 in FIG. 2, that is, a side close to the brake force generation portion 120 corresponds to a space to which the parts are installed, and a space between the two-dot chain line 170 and the resin plate 200 corresponds to an air space interrupting heat. An air space is provided along a surface of the resin plate 200 close to the electric circuit portion 140. Since an air chamber is formed in the resin plate 200 close to the brake force generation portion 120, a heat conduction from the brake force generation portion 120 to the resin plate 200 is suppressed. Further, since the air chamber is formed in the resin plate 200 close to the electric circuit portion 140, it is possible to suppress a heat conduction from the resin plate 200 to the electric circuit portion 140. Since a resistance of heat conduction is great in the resin plate 200 itself, it is possible to largely reduce a heat transmission from the brake force generation portion 120 to the electric circuit portion 140 on the basis of the provision of the resin plate 200.

In FIGS. 2 and 3, a metal case 300 of the electric circuit portion 140 is largely open in the side close to the brake force generation portion 120 as mentioned above, the opening portion is closed by the resin plate 200, and a protrusion portion 304 is formed in a part in an opposite side thereto. The protrusion portion 304 has a storage portion 312 in an inner portion thereof, and has a second opening 310 on a surface in an opposite side to the brake force generation portion 120. In FIG. 2 the second opening 310 is closed by a cover 306 corresponding to a metal additional member, and the additional member 310 is electrically connected to the case 300.

The case 300 of the electric circuit portion 140 has a holding body 250 made of resin in an inner portion thereof, and a circuit board 260 having the subordinate control apparatus 152 shown in FIG. 1, the inverter module 154 and the power supply circuit 150 are attached to the holding body 250 made of resin. The circuit board 260 has the subordinate control apparatus 152 in FIG. 1 as mentioned above, and is provided with a gate circuit for controlling an inverter included in the subordinate control apparatus 152.

The circuit board 260 is fixed to the resin plate 200 side, that is, the brake force generating portion 120 side, of the holding plate 250 made of resin. A space generated by an air is formed between an electric part 268 constituting the subordinate control apparatus 152 held by the circuit board 260 and the resin plate 200, and a heat conduction is suppressed by the space. Since the circuit board 260 is provided with a CPU and a gate circuit controlling the inverter mentioned above, it is provided with a somewhat larger part such as a capacitor or the like. A concave portion 240 is provided in a portion of these parts of the resin plate 200, whereby the structure is made such that the electronic parts attached to the circuit board 260 are not brought into contact with the resin plate 200, thereby suppressing the heat transmission.

A fixing plate 262 fixing the circuit board 260 to the holding body 250 is arranged in a center side of the vehicle with respect to the circuit board 260, thereby positioning the circuit board 260. Further, there is obtained an effect of absorbing a stress causing a deformation and a breakage in the circuit board. Further, it is possible to increase a heat dissipation performance of the circuit board 260 and an inverter module 154 mentioned below, by using a metal having a high heat conductivity such as an aluminum or the like for the material of the fixing plate 262.

The inverter module 154 is arranged in an opposite side to the brake force generating portion of the fixing plate 262, that is, in a center side of the vehicle, and a heat dissipation surface of the inverter module 154 is fixed so as to be directed to an opposite side to the brake force generating portion 120, that is, to the center side of the vehicle. The heat dissipation surface of the inverter module 154 is structured such as to face to an inner surface of the metal case 300 and be brought into contact with the inner surface of the metal case 300 via the heat conductive resin, in a state in which the product is assembled. An opposite side to the brake force generating portion 120 of the case 300 partly protrudes to an outer side so as to be opened as mentioned above. The remaining portion is covered by the metal case 300, and is used for radiating heat of the inverter module 154. It is possible to increase the heat dissipation performance of the inverter module 154 mentioned above by using the metal having the high heat conductivity such as the aluminum or the like for the material of the case 300. In order to increase the heat dissipation performance of the inverter module 154, a heat radiating grease or the like may be pinched in a connection surface between the inverter module 154 and the outer case 300. Further, since the electric circuit portion 140 is provided in an inner side of the wheel, however, is covered by the metal case 300, it is possible to prevent the interior parts from being damaged against an impact caused by a flying gravel or the like.

The storage portion 312 is formed in an inner portion of the protrusion portion 304, and comparatively large-scaled parts such as a noise reducing coil, a smoothening capacitor 205 and the like are stored therein. Further, the storage portion is formed by a resin in the same manner as the resin plate 200. A lot of bus bars for connecting the interior portion of the electric circuit portion 140 are held in the holding body 250 made of resin. Accordingly, it is possible to hold most of the conductor from the end portion of the internal bus bar conductor to the other end portion by the holding body 250, and it is possible to make the portion existing in the air without being held very short, whereby it is possible to reduce a damage against the vibration.

A sealing material 209 is provided between the brake force generating portion 120 and the resin plate 200, a sealing material 210 is provided between the resin plate 200 and the holding body 250 made of resin, and a sealing material 211 is provided between the holding body 250 made of resin and the metal case 300, respectively. When the brake force generating portion 120 and the electric circuit portion 140 are integrally fixed, the sealing materials 209 to 211 prevent a water, a mud or the like from making an intrusion into the inner portion of the device. In this case, a fixing member 212 corresponds to a screw for integrally fixing the electric circuit portion 140 to the brake force generating portion 120.

A wiring harness 220 has a signal line connecting the electric circuit portion 140 to the superior control apparatus 110 within a vehicle compartment, and a power supply line supplying a direct current from a battery within the vehicle compartment to the electric circuit portion 140 built-in. Further, the wiring harness 220 is stored in a concave portion 338 (FIG. 6) provided in a lower portion on an opposite surface to the brake force generating portion 120 of the case 300, and is fixed by a wiring harness fixing device 222.

Figure 4:
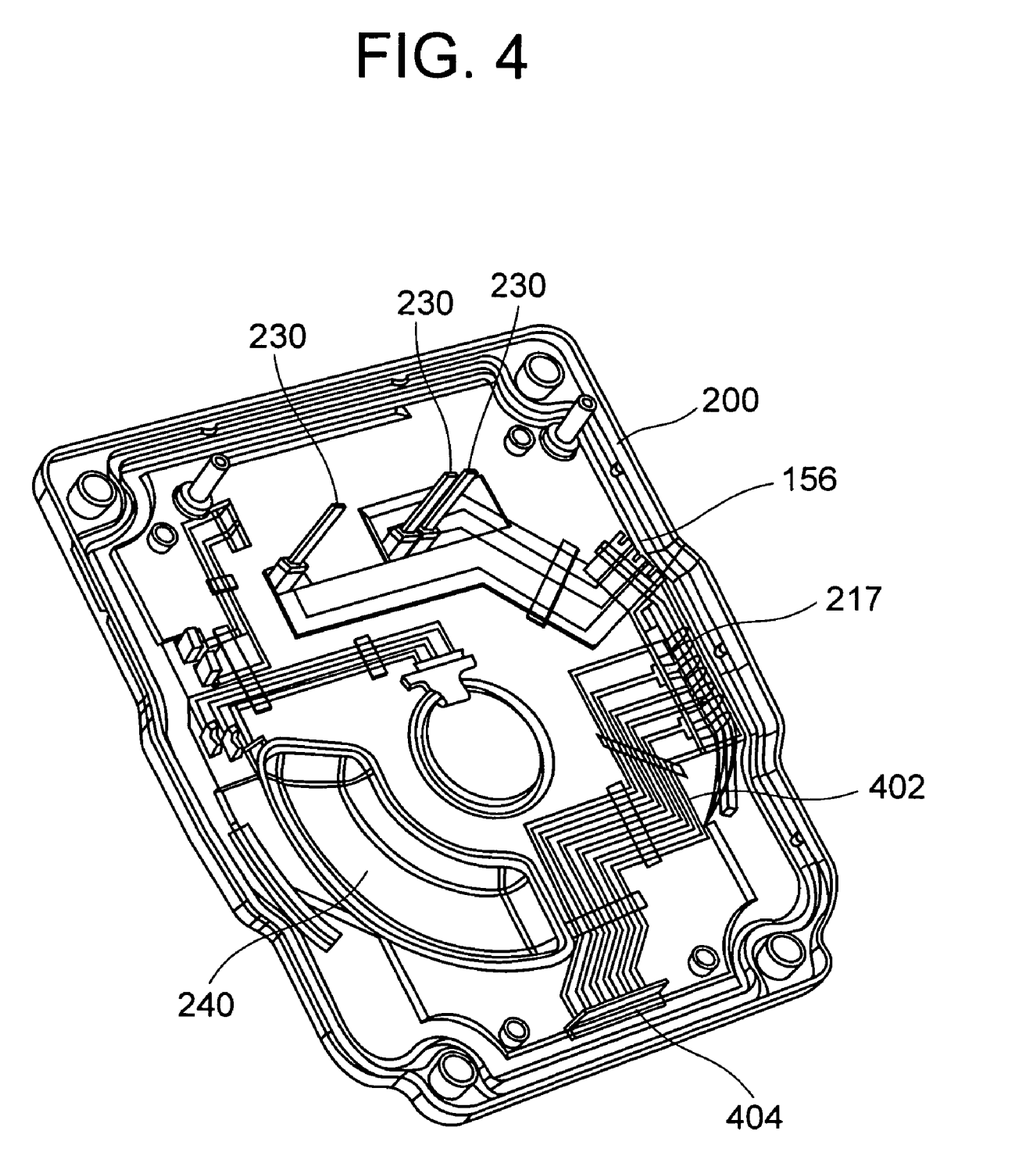
FIG. 4 is a cubic diagram of a resin plate of the electro-mechanical brake apparatus.

FIG. 4 is a view of the resin plate 200 in FIGS. 2 and 3 as seen from a side of the electric circuit portion 140. A description will be given of an electric connection state of the inner portion of the electric circuit portion 140 by using FIG. 4 and FIGS. 2 and 3. Respective power supply lines 156 of U, V and W phases supplying an electric current to a stator coil winding of a permanent magnet type motor provided in the brake force generating portion 120 protrude to an inner portion of the electric circuit portion 140 via a through hole from a back surface of the resin plate 200 in FIG. 4, and is brought into contact with one end of a current supply line 230 corresponding to a plate-like conductor held by being embedded in the resin plate 200. The contact portion is electrically connected in accordance with a weld sticking. The conductor of each of the contact portions is connected in accordance with the weld sticking because it can resist the vibration. Further, the connection portion may be covered in such a manner as to be pinched by a cap-shaped conductor and be connected by a method of crimping from the above of the cap mentioned above.

As shown in FIG. 4, end portions of three current supply lines 230 are weld stuck to respective three U, V and W-phase power source lines 156, center portions of three current supply lines 230 are respectively embedded in the resin plate 200 so as to be held, and the other ends thereof protrude in an opposite direction to the brake force generating portion 120 as shown in FIG. 4. As mentioned below, the protruding portions are electrically connected to three plate-like conductors 232 embedded in the holding body 250 made of resin by the storage portion 312. The plate-like current supply line 230 corresponds to a conductor flowing a heavy current for driving the motor 122 therethrough, and is formed such a shape that a cross sectional area is larger in comparison with a signal line 402 mentioned below.

The concave portion 240 in FIGS. 3 and 4 is provided in such a manner as to prevent the contact with the large-scaled parts such as the capacitor and the like arranged in the circuit board 260, as mentioned above. Further, the concave portion 240 is set such that a whole of the apparatus is not enlarged in a sliding direction of the electro-mechanical brake apparatus, in a relation to an arrangement with the various sensors such as the thrust sensor 128 and the like. Accordingly, it is possible to achieve both of a heat insulating characteristic and a compact size.

A plate-like conductor 217 held by being embedded in the resin plate 200 and protruding from the resin plate 200 is provided with a notch having an approximately V-shaped notch portion in a connected portion and a pinching portion on a slit in the far side thereof. The conductor connected to the conductor 217 corresponds to the special purpose output lines 119 of the various sensors provided in the brake force generating portion 120, is introduced to the electric circuit portion 140 side (a side described in FIG. 4) from a back surface in FIG. 4 through a through hole, and is pressed into the notch mentioned above so as to be fixed. The conductor 117 connected to the sensor output line 119 has a portion 402 embedded in the resin plate 200, the other end forms a rod-like terminal 404 protruding in a rod shape, the rod-like terminal 404 forms a structure of a socket with the connected portion of the line provided in the holding body 250 made of resin, and the rod-like conductor mentioned above is inserted to the corresponding connection hole, thereby being electrically connected. The sensor output is loaded in the CPU of the control apparatus 152 held by the circuit board 260 by being connected to the signal line held by the holding body 250 made of resin, thereby being digital converted so as to be used for controlling the motor 122.

The rod-like conductor 404 extending from the resin plate 200 shown in FIG. 4 is structured such as to be inserted to the connection hole provided in the holding body 250 made of resin, at a time of fixing the holding body 250 made of resin to the resin plate 200 and the brake force generating portion 120 in a state of being held to the case 300, and is electrically connected to a conductor plate 214 connected to the control apparatus 152, or a conductor plate 215 connected to the inverter module 154. These conductors 214 and 215 are weld stuck by a plate-like conductor in accordance with a method such as a laser welding or the like in such a manner that a surface and a surface are brought into contact with each other in a portion necessary for being electrically connected.

Accordingly, a structure which is strong to a vibration is achieved. The connected portion is shown by reference numeral 216.

In FIG. 4 the current supply line 230 held by being embedded in the resin plate 200 is constituted by three lines, and they respectively extend in an opposite direction to the brake force generating portion 120 from the resin plate 200, and reach the storage portion 312 in an inner side of the protrusion portion 304. These three plate-like current supply lines 230 are arranged in the storage portion 312 in such a manner as to be respectively connected to three plate-like conductors 232 held by the holding body 250 made of resin between surfaces, and are connected thereto in accordance with a weld sticking. The connected portion is shown as a connected portion 234 in FIG. 2.

The conductor 232 is held by being embedded in the holding body 250 made of resin, and the other end thereof is connected to the terminal of the inverter module 154. Since the electro-mechanical brake apparatus 100 is mounted to a side closer to the vibration source than the spring for damping the vibration of the vehicle, a violent vibration is transmitted to the electro-mechanical brake apparatus 100, a very high reliability with respect to a vibration countermeasure is required in each of the current supply line 230 and the conductor 232, and the connected portions 234 thereof. In accordance with the structure mentioned above, it is possible to bring the plate-like current supply lines 230 and 232 into contact with each other between the surfaces, whereby it is possible to enlarge a contact area. Further, it is possible to achieve a connection which is strong to the vibration, by connecting the contact portion on the basis of the weld sticking of the conductor itself. Further, since the current supply line 230 is held by being embedded in the resin plate 200, and the conductor 232 is held by being embedded in the holding body 250 made of resin, the current supply lines 230 and 232 are strong to the vibration, and the connected portions thereof are structured such as to be strong to the vibration.

Since the leading ends of the current supply lines 230 and 232 are directed to the same direction, they are easily connected by welding, and a workability is improved. Since the end portions of the current supply lines 230 and 232 have the same direction, the other cap-shaped metal may be covered in such a manner as to pinch both the end portions so as to be crimped.

Next, a description will be given of the protrusion portion 304 of the case 300 and the storage portion 312 provided in the inner portion thereof. FIG. 6A shows the electro-mechanical brake apparatus 100 in a state in which the inner portion of the storage portion 312 is visible, and FIG. 6B shows a partially enlarged view of the wire connection portion 213 of the power supply line, corresponding to a partial enlarged view of FIG. 6A. An opening of the storage portion 312 is covered in a sealed state by the metal cover 306 corresponding to the additional member shown in FIG. 5. The storage portion 312 is provided with a coil 332 for the noise brought therein from the power supply line of the wiring harness 220 and reducing the noise generated within the electric circuit portion 140 and discharged to the outer portion, and stores the smoothening capacitor 334. Two smoothening capacitors 334 mentioned above are connected in parallel to the input power supply side of the power module 154, and suppresses a fluctuation of the d.c. voltage supplied to the power module 154. Each of the end portions of the U-phase, V-phase and W-phase current supply lines 230 in FIG. 4 mentioned above protrudes to the storage portion 312 from the resin plate 200, and is connected to the conductor 232 held by being embedded in the holding body 250 made of resin. The connected state is shown in FIG. 6B in an enlarged manner. Each of the end portions of three conductors 232 held by the holding body 250 protrudes from the holding body 250, and further protrudes to an opening direction of the protrusion portion 304 corresponding to the same direction as the end portion of the current supply line 230 from the hole provided in the holding body 250, and the end portions of the current supply lines 230 and 232 are brought into contact with each other between the surfaces, and are weld stuck so as to be electrically connected. Further, the conductor connected to the terminal of the smoothening capacitor 334 is embedded in the holding body 250, and is connected to the end portion of the embedded conductor.

Since the current supply lines 230 and 232 and the conductor for conducting the capacitor are held by the holding body 250, it is possible to achieve the structure which is strong to the vibration, and since the connected end portion is short, the connected end portion is strong to the vibration. As mentioned above, since the storage portion 312 has the opening, the end of the bus bar necessary for connection protrudes to the storage portion from the hole provided in the holding body 250, at a time of fixing the cover 300 and the holding body 250 to the brake force generating portion 120. Since the opening is provided in the storage portion, an excellent workability is obtained. Further, it is possible to check out the wire connection portion 213 of the power supply line by a visual observation, and a workability is improved. Further, it is possible to check out the connected portion between the signal line and the power supply line within the wiring harness 220 and the parts and the bus bar stored in the storage portion 312 by a visual observation or the like, and a reliability is improved. Of course, since the work can be executed from the opening, a workability is improved.

Figure 5A:
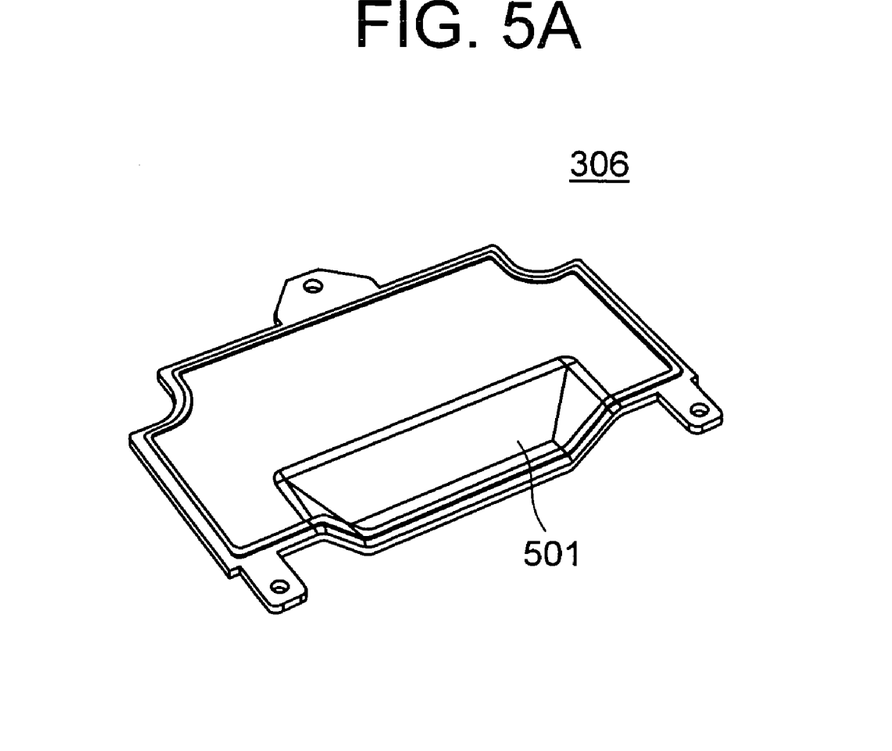
FIGS. 5A and 5B are cubic diagrams of a cover covering an opening of a circuit portion cover.
Figure 5B:
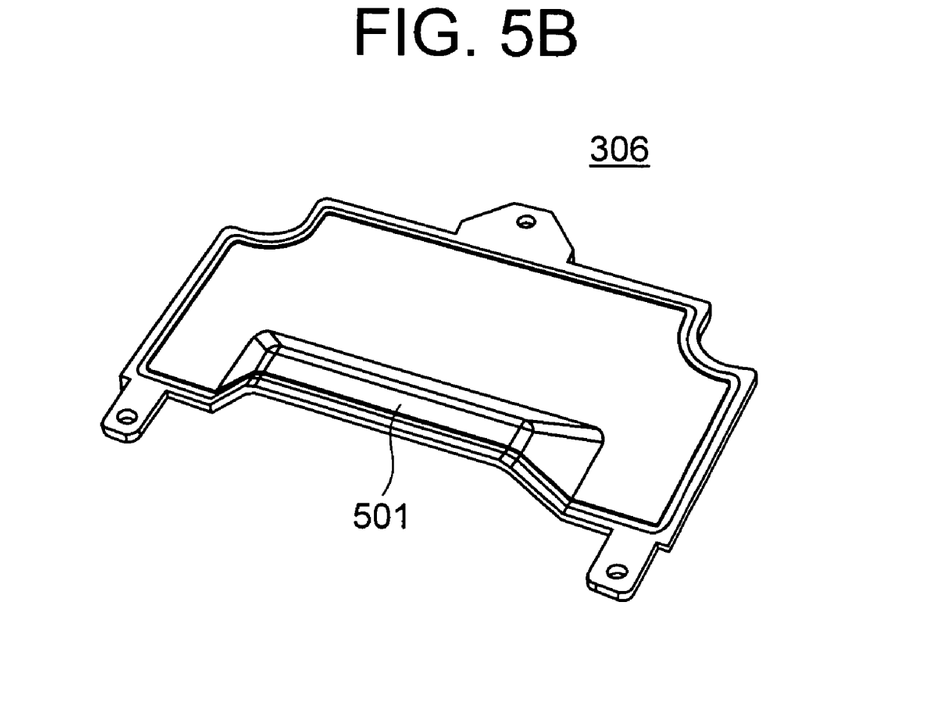
Figures 6A, 6B:
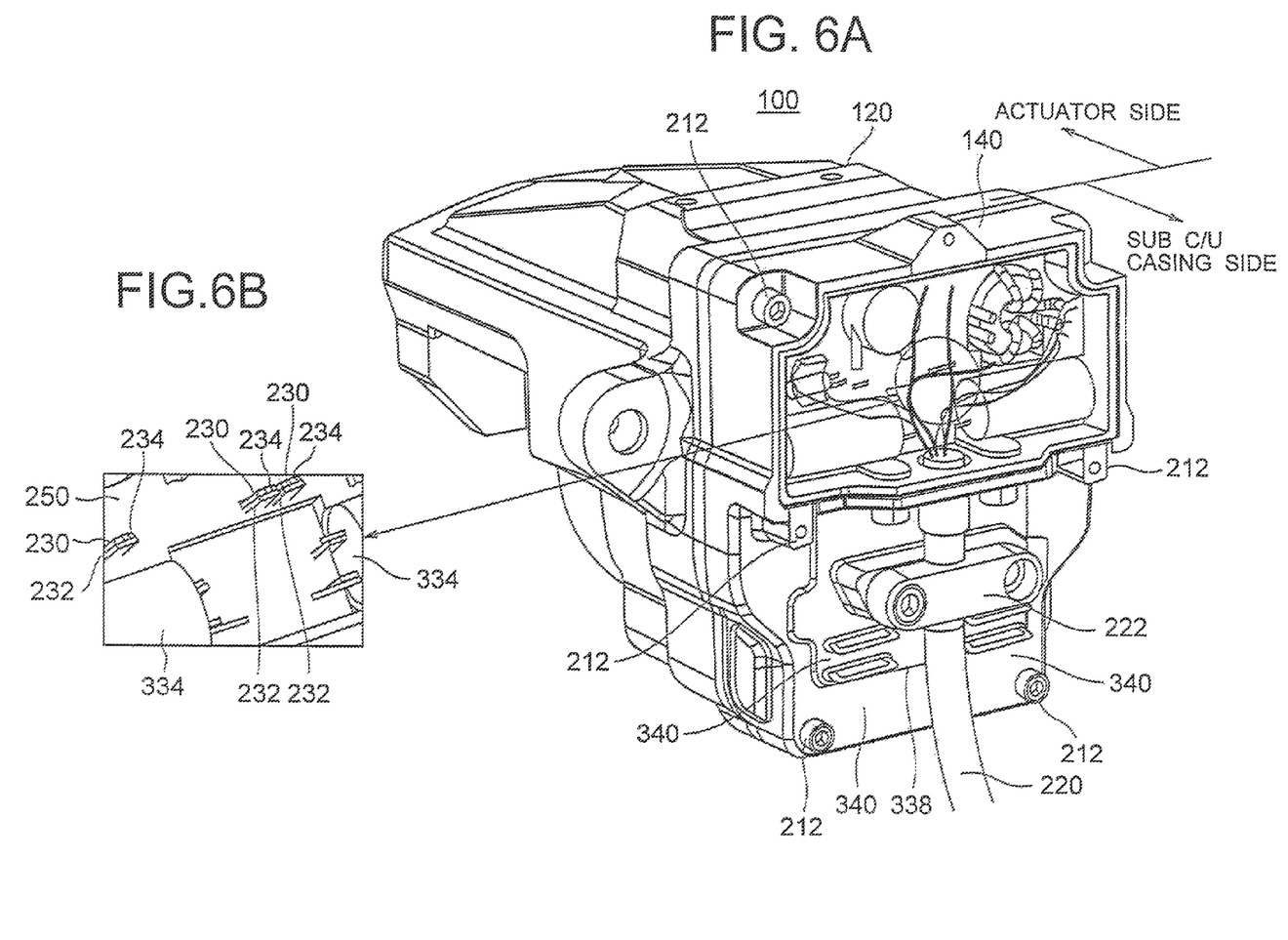
FIGS. 6A and 6B are cubic diagrams of the electro-mechanical brake apparatus before the cover is attached.

The opening provided in the storage portion 312 in FIG. 6A is closed by the metal cover 306 shown in FIG. 5, is fitted to the storage portion 312 of the holding body 250 made of resin at this time, and seals the storage portion 312. FIG. 5A shows an inner surface of the storage portion 312, and FIG. 5B shows an outer surface thereof. A concave portion 501 in the case of being seen from the outer surface is formed as a shape for connecting and storing the wiring harness 220. Since the metal or the like having a high strength is used for the material of the cover 306, it is possible to prevent the internal parts from being damaged by the flying gravel. The cover 306 is fitted by a structure being fitted to a portion around the opening portion of the storage portion 312 and pinching an elastic body covering a whole of the fitted surface, so as to be fixed. The cover 306 is electrically connected to the metal case 300 and a metal screw 212. Accordingly, the electric circuit portion 140 can be formed as a sealed structure, and can be structured such as to prevent the internal electric parts from being short circuited due to an invasion of the water or the like. Further, it is possible to remove an electric noise from the external portion.

The storage portion 312 is provided in an inner portion of the protrusion portion 312, and the wiring harness 220 connected to the storage portion 312 is fixed to the portion which does not protrude in the case 300, by the fixing device 222. A groove 338 in which the wiring harness 220 enters is formed in an outer side of the portion which does not protrude in the case 300, by forming a notch in a heat radiating fin 340.

As shown in FIG. 6, since the structure is made such that the wiring harness 220 is connected to the storage portion provided in the protrusion portion of the case 300 from the portion which does not protrude in the case 300, the moving direction and the direction of the wiring harness 220 are approximately perpendicular with respect to the motion of the electro-mechanical brake at a time of braking. Therefore, there is obtained the structure to which an unreasonable mechanical stress is not applied, and which is hard to be damaged.

Figure 7:
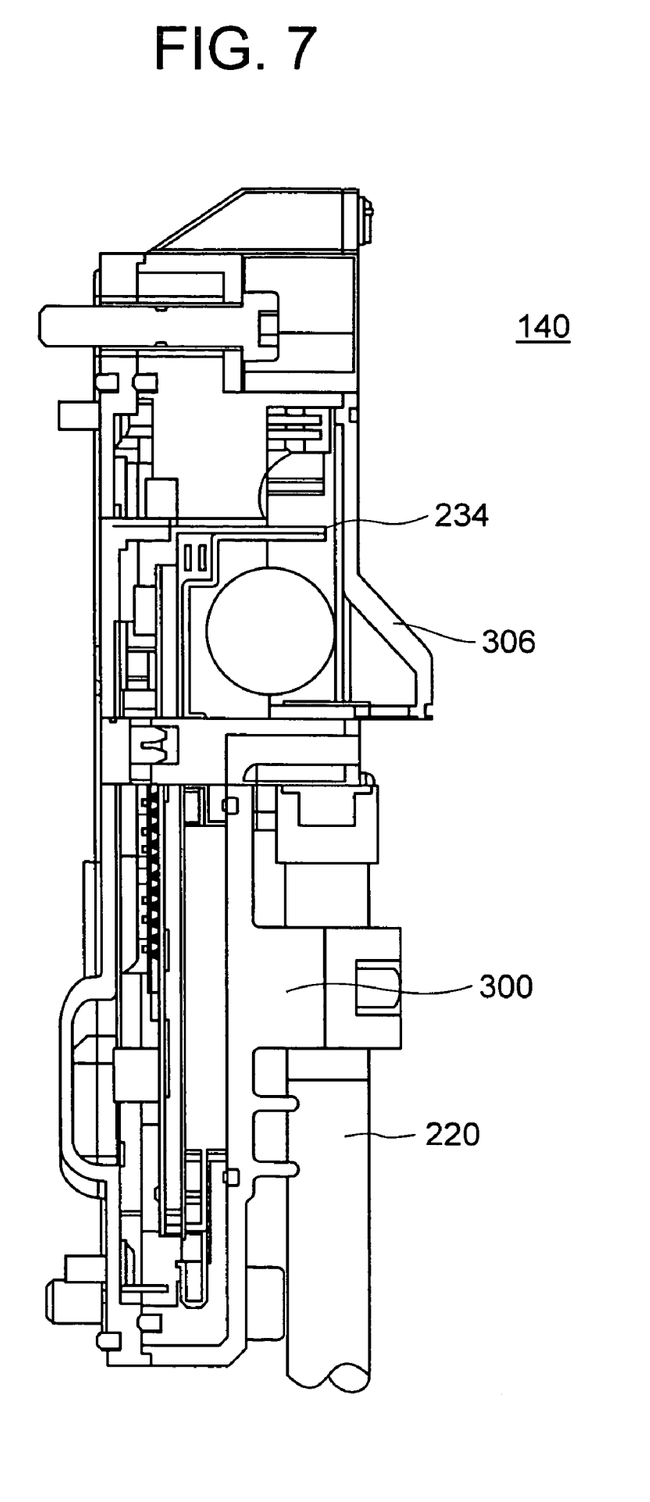
FIG. 7 is a cross sectional view of an electric circuit portion.

FIG. 7 shows absolutely the same structure as FIG. 2. A tint ink in FIG. 7 shows a cross section of the metal case. In this case, the other reference numerals are omitted.

Embodiment 2

Figure 8:
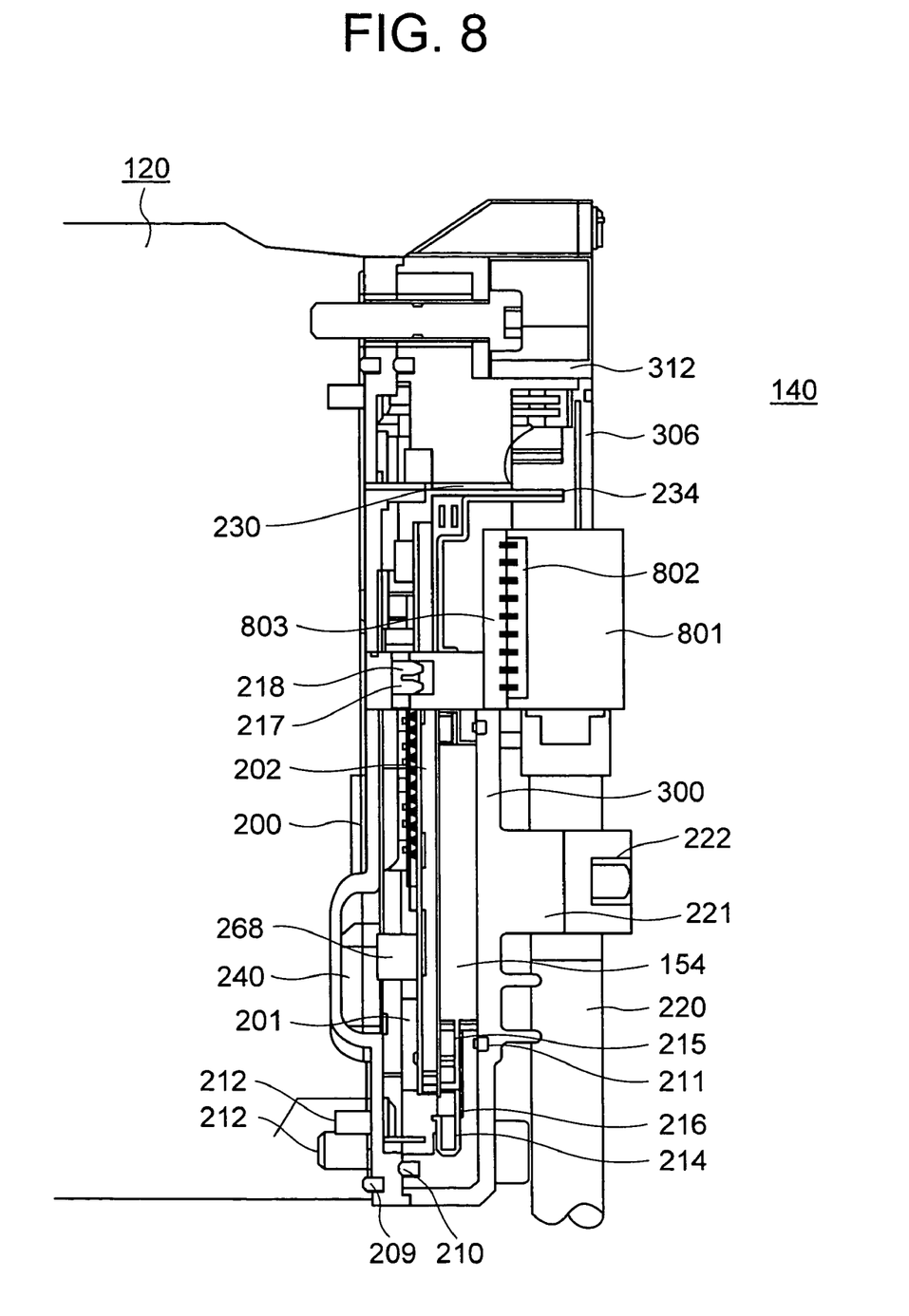
FIG. 8 is a cross sectional view showing the other embodiment of the circuit portion of the electro-mechanical brake apparatus.

The other embodiment in accordance with the present invention will be shown in FIG. 8. In this case, in order to avoid a complication, a display of reference numerals will be omitted, however, the structure is approximately the same as the previous embodiment. A difference from the embodiment described in FIGS. 2 to 7 exists in a point in which the wiring harness in FIG. 8 is structured such as to be connected to the electric circuit portion 140 via a connecter, in place of the structure described in FIGS. 2 to 7 in which the bus bar of the wiring harness is directly connected to the storage portion. The structure of the inner portion of the storage portion 312 is the same as the embodiment 1. The opening of the storage portion 312 is structured such as to be closed by the cover 306, and in a state before the cover is attached, the storage portion 312 is visible from the outer portion, and it is possible to execute the connecting work from the opening.

The same connection as the connection to the wiring harness 220 in the embodiment described in FIGS. 2 to 7 is achieved by the connector. The line connected by the connector is constituted by the power supply line to the battery, and the signal line 10 connecting the superior control apparatus 110 and the electric circuit portion 140, which are provided in the inner portion of the wiring harness 220. The wiring harness 220 is provided with a connector 801 in a vehicle side, and a connector 803 is connected to the side of the electric circuit portion 140. If the connector 801 in the vehicle side is fitted to the connector 803 in the electric circuit portion side, a leading end of the vehicle side connector 801 is closely attached to an outer periphery of the connector 803. In this case, the structure may be made such that the connector 803 in the electric circuit portion 140 side protrudes out of the electric circuit portion 140 so as to be connectable with the vehicle side connector 801. Further, any of the connectors may be set as a male side connector. After the connection of the connector is finished, the wiring harness is fixed by the wiring harness fixing device 222. Accordingly, it is possible to reduce the damage of the wiring harness caused by the vibration from the wheel or the like.

Embodiment 3

Figure 9:
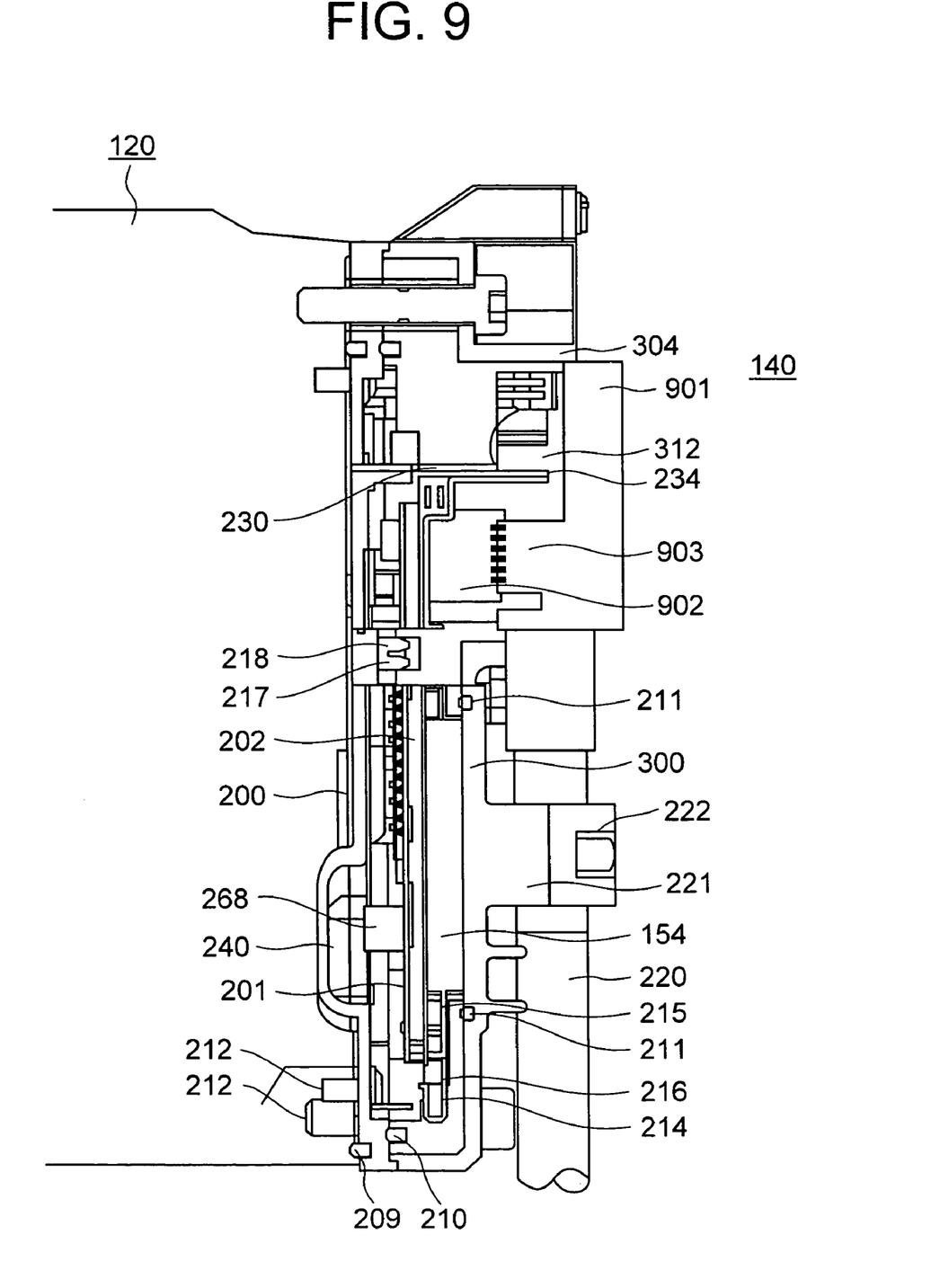
FIG. 9 is a cross sectional view showing further the other embodiment of the circuit portion.

Further the other embodiment in accordance with the present invention is shown in FIG. 9. This embodiment is the same in a point that the electric circuit portion 140 and the wiring harness 220 are connected via the connector, however, is different in a point that the connector and the cover 306 in FIG. 8 are integrally formed. The storage portion 312 is provided in the inner portion of the protrusion portion of the surface in the center side of the vehicle in the same manner as the embodiments 1 and 2, and is structured such that the inner portion is visible from the opening and the connecting work can be executed from the opening, before putting the cover thereon. The embodiment in FIG. 9 has an effect of making the brake apparatus compact in size in the case that an installing space of the brake apparatus is limited by existence of the suspension parts.

Figure 10:
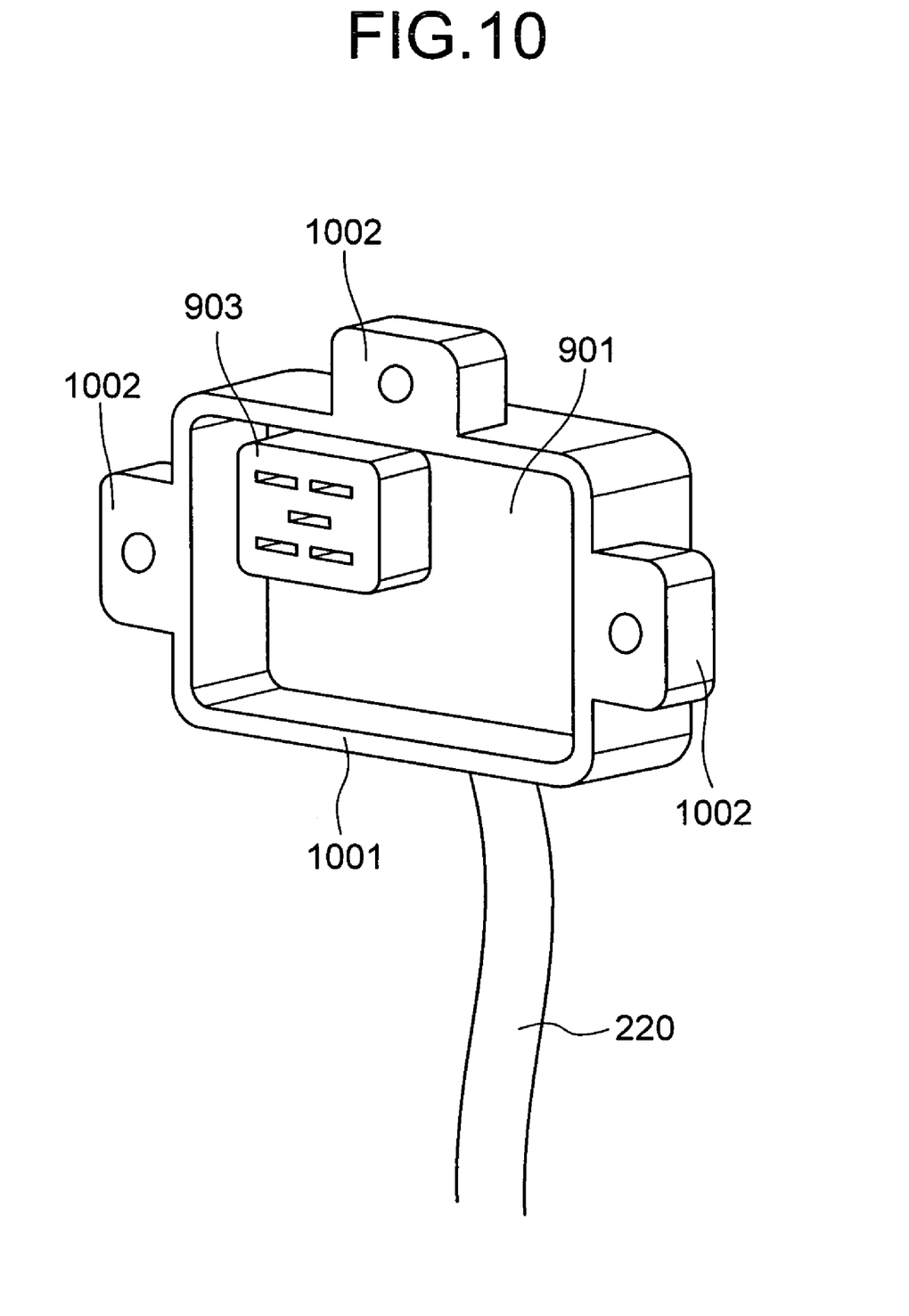
FIG. 10 is a cubic diagram showing the other embodiment of a wiring harness connection portion.
Figure 11:
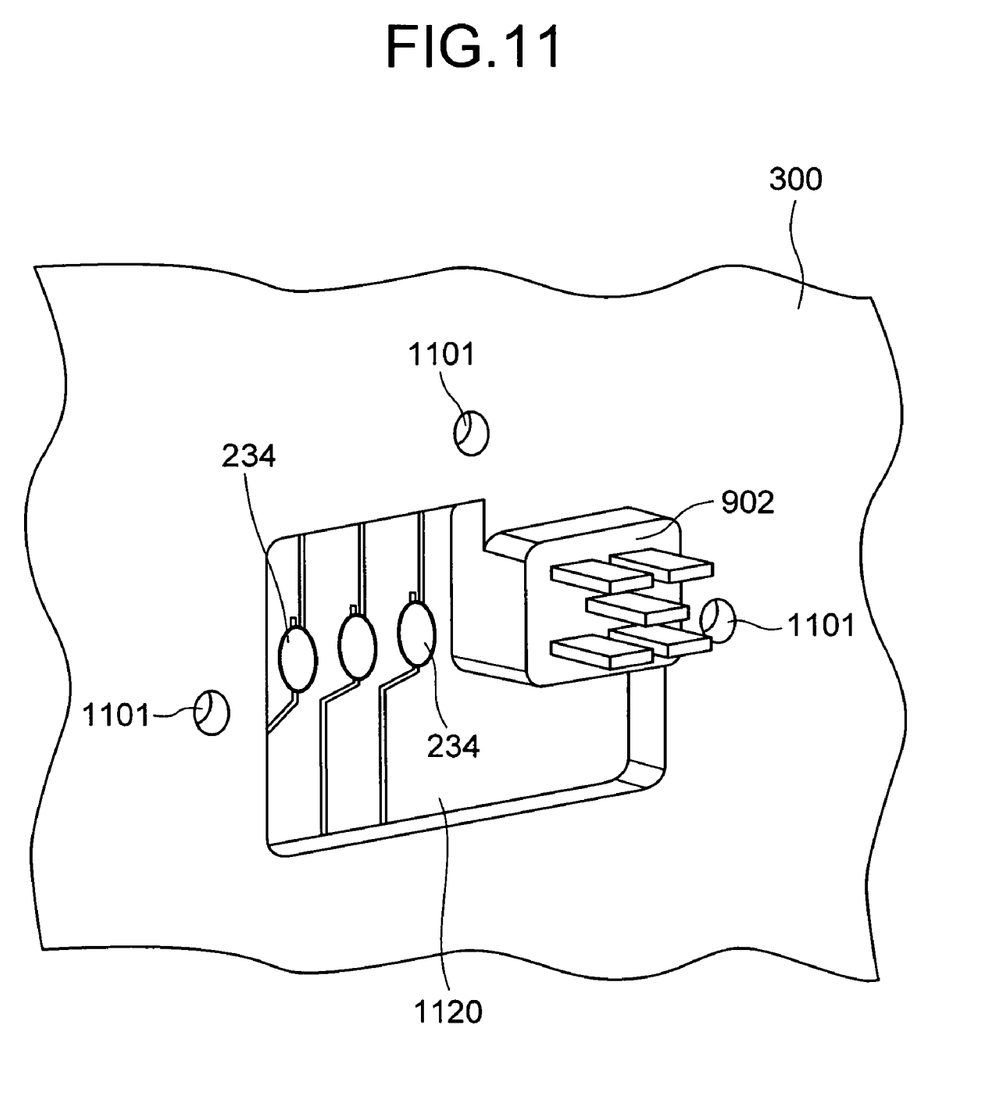
FIG. 11 is a cubic diagram close to a circuit showing the other embodiment of the wiring harness connection portion.

FIGS. 10 and 11 show a schematic view of a connector doubling as the cover in accordance with further the other embodiment. A vehicle side connector 903 has a housing 901. The vehicle side connector 903 described in FIG. 10 is connected to a connector 902 in the electric circuit portion 140 side described in FIG. 11, and the housing 901 in FIG. 10 is structured such as to close an opening 1120 in FIG. 11. The housing 901 is larger than the vehicle side connector 903, for the reason of securing an opening space for executing a visual observation or a connecting work by enlarging the opening. A projection portion 1002 of the housing 901 corresponds to a member for fixing the housing 901 of the vehicle side connector to the electric circuit portion 140, and is fixed to a fixing hole in FIG. 11 by a screw. A position of the vehicle side connector 903 is determined by a position of the electric circuit side connector 902, and is not limited to the position in FIG. 10. Further, a number of terminals and a number of bolt holes described in the vehicle side connector 903 are not limited. The housing 901 of the vehicle side connector is attached to the circuit side connector 902 after the connecting work of the inner portion of the electric circuit portion 140 and the check of the state, so as to be firmly attached to the electric circuit portion 140 by using the screw mentioned above or the like. Further, it is possible to prevent the water, the mud or the like from making an intrusion, by pinching the sealing material in an edge 1001 of the housing 901 of the vehicle side connector, and it is possible to secure an assured reliability, even under an unsprung mounting condition of the motor vehicle.

As mentioned above, FIG. 11 shows the circuit side connector 902 provided in a part of the case 300 of the electric circuit portion 140. The storage portion 312 exists in an inner side of an opening 1120 as described in FIGS. 2 to 7, and the connection portion 234 is positioned within the storage portion. The position of the circuit side connector 902 is not limited to FIG. 11, but may be set as far as it fits to the connector doubling as the cover. A fixing hole 1101 corresponds to a thread hole for fixing the housing 901 of the vehicle side connector. In FIGS. 10 and 11, any of the connectors in the vehicle side and the circuit side may be set to the male side.

The embodiment mentioned above has the following effect.

It is possible to securely connect the electric bus bar at a time of fixing the electric circuit portion 140 integrally with the brake force generation portion 120.

Further, the portion near the brake rotor becomes high temperature due to a friction at a time when the brake is actuated. It reaches a high temperature, for example, about 600° C. At this time, the circuit portion supplying the heavy current generates heat. It is possible to stably execute the brake operation while responding to both these heat generations.

Further, the circuit portion and the whole of the brake apparatus become compact in size, and it is possible to reduce the space necessary for being mounted to the vehicle. Further, the assembly is easily executed, and the workability is improved.

Further, in accordance with the embodiment mentioned above, the structure is made such that the storage portion 312 can be visible from the outer side of the case 300, before the opening is closed. A workability of a production step is improved by arranging the plate-like current supply line 230 and the wire connection portion 234 of the conductor 232 in the storage portion 312 in the production step. The wire connection of the conductor plate arranged in the storage portion 312 corresponds to the power supply line of the motor through which the electric current for driving the motor 122 flows, and is particularly required a reliability of connection.

The brake control apparatus is attached to the side closer to the vibration source than the vibration damping spring, and is used under a very bad environmental condition. It is possible to secure a stable operation having a high reliability under this state. Further, the vehicle is used for many years, however, the reliability mentioned above can be maintained.

The present invention has a heat source in the periphery thereof, and can be applied to the brake apparatus in which the circuit itself generates heat at a time of controlling.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electro-mechanical brake apparatus comprising:
a brake force generating portion provided with an outer brake pad and an inner brake pad respectively pressing an outer friction lining and an inner friction lining of a disc rotor rotating together with a wheel, a motor generating a rotating torque, and a conversion mechanism generating a pressing force of said outer and inner brake pads on the basis of said rotating torque; and
an electric circuit portion having a control board for controlling the rotating torque of said motor, an inverter module supplying an electric current to said motor on the basis of a control signal from said control board, and a metal case storing said control board and said inverter module,
wherein said electric circuit portion is attached to an outer side of said brake force generating portion,
wherein said metal case has a first opening in an opposite side to said brake portion, a connection portion between a first current supply line supplying an electric current to said motor and a second current supply line connected to a terminal of said inverter module is arranged in a space within said metal case facing to said first opening, and said first opening is sealed by a metal member,
wherein said metal case of said electric circuit portion has a second opening larger than said first opening, and a resin wall closing said second opening, in a side of said brake force generating portion,
wherein a protrusion portion is formed in an opposite side to said brake portion in said metal case, and said first opening is provided in said protrusion portion, and
wherein said space is provided in an inner portion of said protrusion portion, said connection portion between said first current supply line and said second current supply line is arranged in said space, and a smoothening capacitor is arranged in said space.

2. An electro-mechanical brake apparatus as claimed in claim 1, wherein a power supply line is connected in such a manner as to supply a direct current to the apparatus from an external portion in said space.

3. An electro-mechanical brake apparatus comprising:
a brake force generating portion having a brake pad pressed by a disc rotor rotating together with a wheel, a motor generating a rotating torque, a transducer generating a pressing force of the brake pad on the basis of said rotating torque, and a metal first case storing said brake pad, said motor and said transducer, and
an electric circuit portion having control board for controlling the rotating torque of said motor, an inverter module having an inverter element and provided for controlling a drive current to said motor on the basis of an output of said control board, and a metal second case storing said control board and said inverter module,
wherein said electric circuit portion is attached to an outer side of said brake force generating portion,
wherein said electric circuit portion has a first current supply line and a second current supply line for flowing a drive current supplied to the motor, and the drive current of the motor controlled by said inverter module is structured such as to pass through said second current supply line, and be supplied to said motor through the first current supply line,
wherein said second case has a first storage portion and a second storage portion in an inner side thereof, and said second case further has a first opening open to said first storage portion,
wherein said inverter module is provided in said second storage portion in such a manner that a heat radiating surface faces to an inner surface of said second case,
wherein a second current supply line extends to said first storage portion from said second storage portion, and said second current supply line and said first current supply line are connected in said first storage portion,
wherein a metal member for closing the opening is provided in said first opening,
wherein said second case of said electric circuit portion has a second opening larger than said first opening, and a resin wall closing said second opening, in a side of said brake force generating portion,
wherein said control board and said inverter module are provided between said second case and said resin wall,
wherein said inverter module is arranged in said metal case side in such a manner that a heat radiating surface thereof faces to an inner surface of said metal case,
wherein said control board is arranged between said resin wall and said inverter module in such a manner that a space is formed with respect to said resin wall,
wherein a capacitor is arranged in said first storage portion, and a direct current supply line supplying a direct current to said second storage portion from said first storage portion is provided in said first storage portion and said second storage portion, and
wherein the direct current is supplied to said first storage portion from an external portion, the direct current is supplied to said inverter module of said second storage portion via said direct current supply line, and a drive current fir driving said motor from said inverter module is supplied to said first storage portion from said second storage portion by said second current supply line, is introduced to said first current supply line by said first storage portion, and is supplied to said motor.

4. An electro-mechanical brake apparatus as claimed in claim 3, wherein a power supply line is connected in such a manner as to supply a direct current to the apparatus from an external portion in said first storage portion.

5. An electro-mechanical brake apparatus comprising:
a brake force generating portion having a brake pad pressed by a disc rotor rotating together with a wheel, a motor generating a rotating torque, a transducer generating a pressing force of the brake pad on the basis of said rotating torque, and a metal first case storing said brake pad, said motor and said transducer, and
an electric circuit portion having a control board for controlling the rotating torque of said motor, an inverter module having an inverter element and provided for controlling a drive current to said motor on the basis of an output of said control board, and a metal second case storing said control board and said inverter module, wherein said electric circuit portion is attached to an outer side of said brake force generating portion, wherein said electric circuit portion has a first current supply line and a second current supply line for flowing a drive current supplied to the motor, and the drive current of the motor controlled by said inverter module is structured such as to pass through said second current supply line, and be supplied to said motor through the first current supply line, wherein said second case has a first storage portion and a second storage portion in an inner side thereof, and said second case further has a first opening open to said first storage portion, wherein said inverter module is provided in said second storage portion in such a manner that a heat radiating surface faces to an inner surface of said second case, wherein a second current supply line extends to said first storage portion from said second storage portion, and said second current supply line and said first current supply line are connected in said first storage portion, wherein a metal member for closing the opening is provided in said first opening, wherein said metal case of said electric circuit portion has a second opening larger than said first opening, and a resin wall closing said second opening, in a side of said brake force generating portion, wherein a protrusion portion is formed in an opposite side to said brake portion in said metal case, and said first opening is provided in said protrusion portion, wherein said space is provided in an inner portion of said protrusion portion, the connection portion between said first current supply line and said second current supply line is arranged in said first storage portion, a capacitor is arranged in said first storage portion, and a direct current supply line is provided between said first storage portion and said second storage portion, and wherein the direct current is supplied to said first storage portion from an external portion, the direct current is supplied to said inverter module of said second storage portion via said direct current supply line, and a drive current for driving said motor from said inverter module is supplied to said first storage portion from said second storage portion by said second current supply line, is introduced to said first current supply line by said first storage portion, and is supplied to said motor.

6. An electro-mechanical brake apparatus comprising:

a brake force generating portion having a brake pad pressed by a disc rotor rotating together with a wheel, a motor generating a rotating torque, a transducer generating a pressing force of the brake pad on the basis of said rotating torque, and a metal first case storing said brake pad, said motor and said transducer, and an electric circuit portion having a control circuit for controlling the rotating torque of said motor, an inverter module having an inverter element and provided for controlling a drive current to said motor on the basis of an output of said control circuit, and a metal second case storing said control circuit and said inverter module, wherein said electric circuit portion is attached to an outer side of said brake force generating portion, wherein said second case is provided with a first portion protruding to an outer side by partly protruding to an outer side in an opposite side to said brake portion, and a second portion of the second case corresponding to the other portion, a first opening is provided in the first portion of said protruding second case, and the first storage portion is provided in an inner side of the first portion of said second case, wherein said second case has a first current supply line and a second current supply line in an inner side thereof, and a drive current of the motor controlled by said inverter module is structured such as to pass through said second current supply line, further pass through the first current supply line and be supplied to said motor, wherein said inverter module is provided in said second case in such a manner that a heat radiating surface faces to an inner surface of the second portion of aid second case, wherein a second current supply line for flowing the drive current controlled by said inverter module therethrough extends to said first storage portion, and said second current supply line and said first current supply line are connected in said first storage portion, wherein a metal member for closing the opening is provided in said first opening, wherein said second case of said electric circuit portion has a second opening larger than said first opening, and a resin wall closing said second opening, in a side of said brake force generating portion, wherein a holding body made of resin is provided between said resin wall and said second case, said control circuit is held to said resin wall side of said holding body made of resin, and a space is formed between said control circuit and said resin wall, and wherein said inverter module is arranged in said second case side of said holding body made of resin, whereby the structure is made such that a heat in an inner surface of the second portion of said second case is transmitted from the heat radiating surface of said inverter module.

* * * * *